H. LAMMERTZ.
PORTABLE GARBAGE PLANT.
APPLICATION FILED APR. 7, 1917.
1,259,248.
Patented Mar. 12, 1918.
2 SHEETS—SHEET 1.
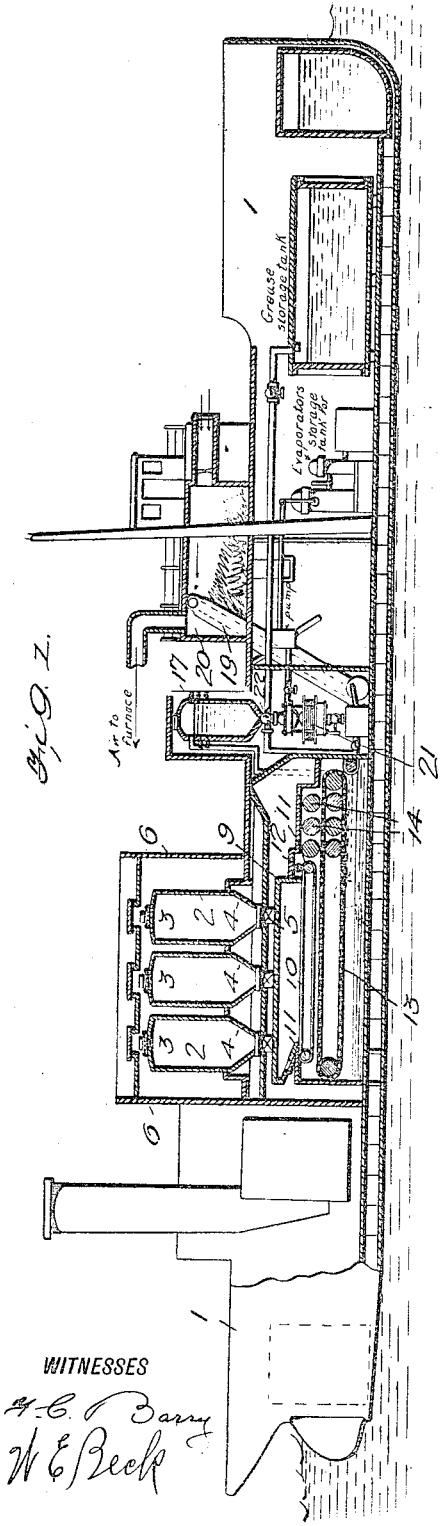
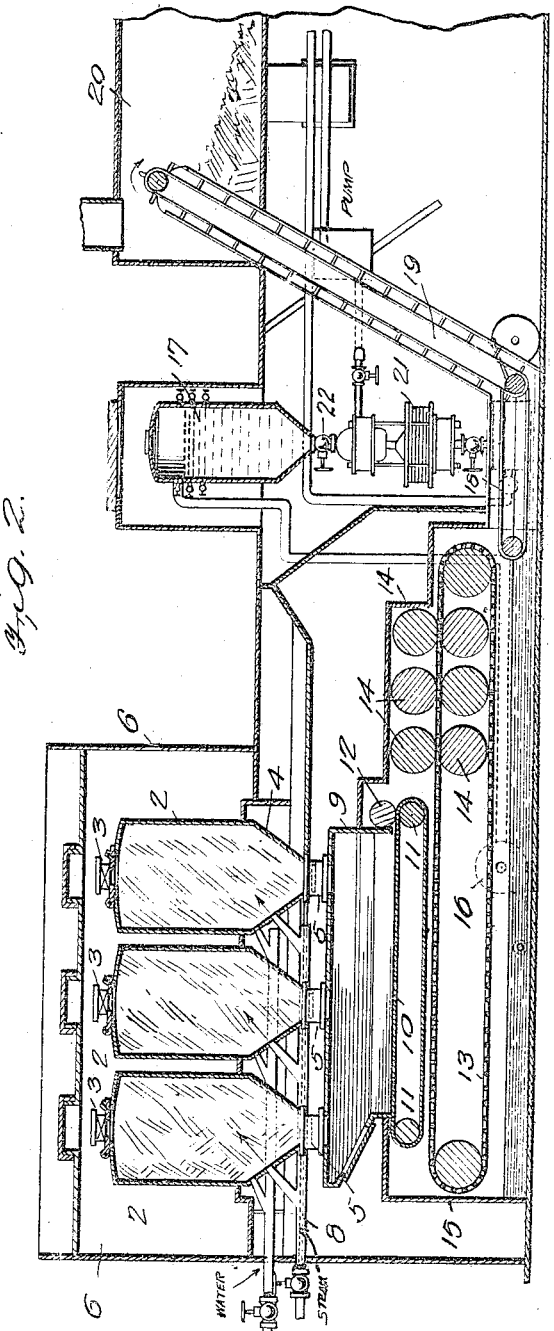
WITNESSES
INVENTOR
Henry Lammertz
ATTORNEYS

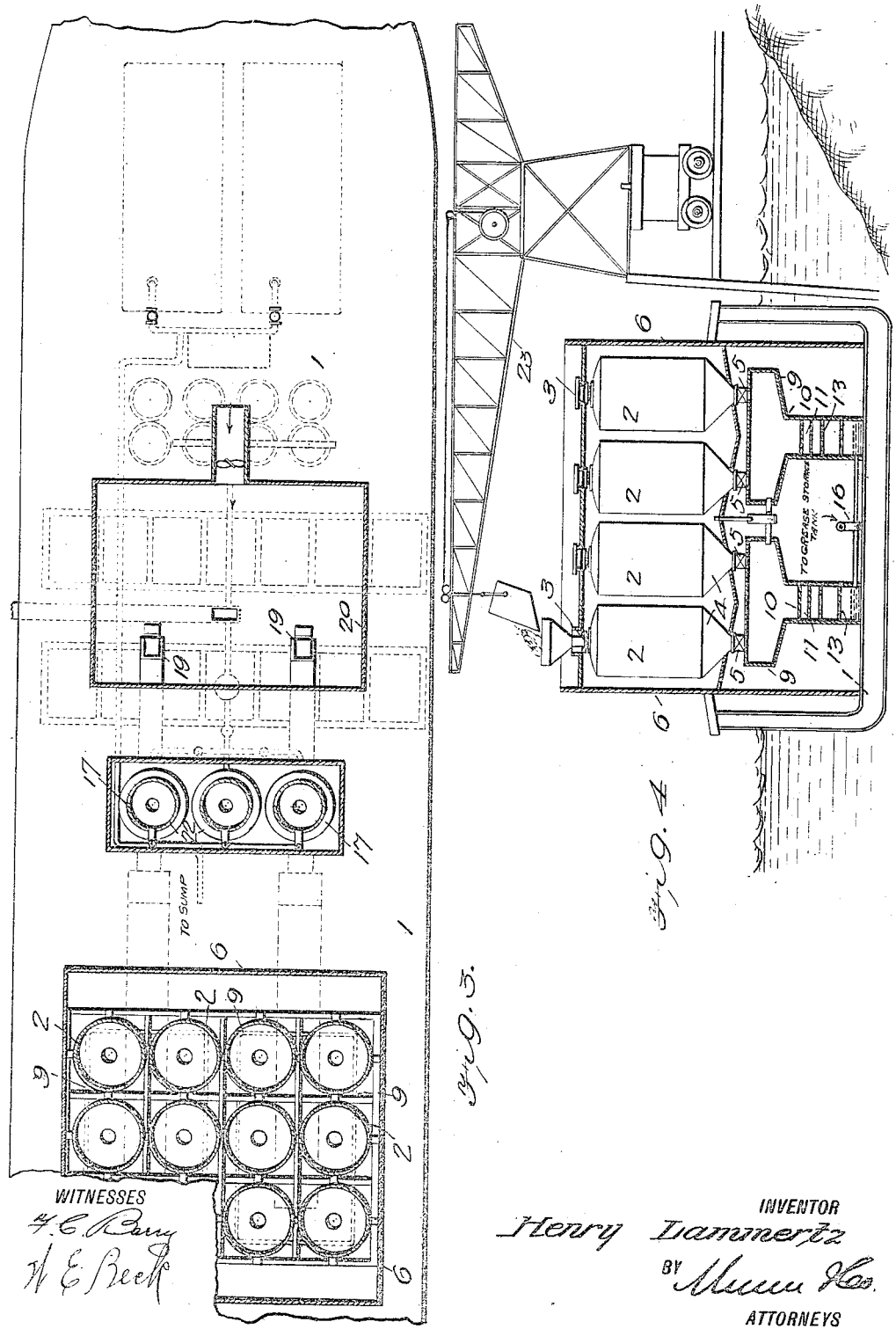

UNITED STATES PATENT OFFICE.

HENRY LAMMERTZ, OF PHILADELPHIA, PENNSYLVANIA.

PORTABLE GARBAGE PLANT.

1,259,248.

Specification of Letters Patent.   Patented Mar. 12, 1918.

Application filed April 7, 1917.   Serial No. 160,586.

*To all whom it may concern:*

Be it known that I, HENRY LAMMERTZ, a citizen of the United States, and a resident of Philadelphia, in the county of Philadelphia and State of Pennsylvania, have invented a certain new and useful Improvement in Portable Garbage Plants, of which the following is a specification.

My invention relates to improvements in portable garbage plants, and it consists in the combinations, constructions, and arrangements herein described and claimed.

An object of my invention is to provide a portable garbage disposal plant which may be moved from place to place as occasion demands. It often happens that a city will grow up to the location of a permanent garbage plant, that the latter is thereupon declared a nuisance, and steps are taken to have it removed or shut down, thereby entailing great loss to the owners of the plant.

The main object of the invention is to provide a garbage plant located on a vessel or boat which can proceed under its own power from place to place, or be towed to the location which is most desirable. If occasion should arise to move the plant, it can be readily towed to some other place, or it can proceed under its own steam if the boat should be self-propelled.

Another object is to provide a garbage plant which, if necessity arises, may receive the garbage at one point, as for instance, at the city docks, and then can proceed away from the city and carry on the subsequent operation.

A further object of my invention is to provide a novel form of plant for carrying out the treatment of the garbage.

Other objects and advantages will appear in the following specification, and the novel features of the invention will be particularly pointed out in the appended claims.

My invention is illustrated in the accompanying drawings forming part of this application, in which:

Figure 1 is a sectional view of a boat showing the main portions of the garbage plant disposed thereon;

Fig. 2 is an enlarged sectional detail view of the plant;

Fig. 3 is a horizontal sectional view of a portion of a device, and

Fig. 4 is a transverse sectional view showing the means for filling the digesters.

In carrying out my invention I provide a suitable boat or vessel, such as that shown at 1 in Fig. 1. In the present instance I have shown the plant as being located on a self-propelled vessel, but it will be understood that it might be located on a scow or other floating device which may be towed by a tug or similar vessel.

Referring now to the drawing it will be seen that I have provided a series of digesters 2, these digesters being provided with hinged manholes 3 at their top and having tapered or converging bottoms 4. Each digester is controlled by a gate valve 5. These digesters are arranged in batteries as shown in Fig. 3, and are in an inclosure known as a tank room 6. Leading to the bottom of each digester is a connection to a water pipe 7, while a steam pipe 8 communicates also with the bottoms of the digesters, as clearly shown in Fig. 2.

Disposed below the digesters are receiving tanks, like that shown at 9 in Fig. 2. Each of these receiving tanks is designed to receive the contents of six digesters. The bottoms of the receiving tanks are inclined so as to guide the contents toward the central part. Just underneath this central part is a traveling belt or apron 10 which runs over rollers 11, a pressure roller 12 being provided whose purpose will be explained later.

Underneath the apron 10 is a perforated steel apron 13 which passes between pressure rollers 14. The moisture and grease which drain through the perforated apron into the bottom of the compartment 15 are pumped by a pump into a grease separating tank 17.

At the end of the apron 13 is an endless belt 18 which forms the heel of a conveyer 19 which conveys the solid matter into a storage tank 20.

Disposed below the tank 17 is a hydraulic press 21, this hydraulic press being of any suitable type.

From the foregoing description of the various parts of the device, the operation thereof may be readily understood.

The garbage is dumped by the carts of the department of street cleaning upon the deck of a scow fitted with a crane, or the crane may be disposed on the dock or pier, as shown at 23 in Fig. 4. By means of this crane the garbage is dumped into the hoppers of the digesters 2. These are sealed as soon as filled, and steam is turned on at a pressure of seventy-five pounds and the cooking commences. After the cooking process is completed the tanks are emptied by opening the gate valve and the contents of the digesters pass on into the receivers. The solid matter is carried by the apron 10 between the rolls 11 and 12, and there the garbage is crushed and discharged upon the perforated steel apron 13. The grease and moisture pass through the perforations into the bottom of the compartment 15, and are drawn by means of the pump 16 into the grease separating tank 17, as already described. The solid portions are passed on to the rolls 14 and thence to the conveyer 18. The conveyer deposits the pressed matter in the storage room 20. A large proportion of grease is recovered in the settling tank 17, but there still remains in the water valuable solid matter. The liquid containing this solid matter is passed on to the hydraulic presses 21 by opening the valve 22. The solid matter is pressed out on cheese cloth, and the remaining liquor is pumped away for evaporation. In this manner all the available solids are recovered.

It sometimes happens that liquor from the hydraulic press may contain grease which may require further treatment to recover it. This liquor may be passed on to auxiliary grease separating tanks 23 where the grease may be recovered.

One advantage of this system is that it may be used with the least inconvenience to the citizens of a community. For instance, the garbage may be loaded into the digesters at the dock, and then the plant may be towed away from the city, or if the plant is located on a self-propelled vessel, it can steam some distance away to carry out the process. The plant will always be returned to the dock clear of any previous day's material, and will be in perfect sanitary condition. The fertilizer pressed from the garbage will be taken away daily by closed barges.

I claim:

1. A portable garbage plant consisting of a plurality of steam cookers, receivers disposed beneath the cookers, each of said receivers being provided with a bottom comprising an endless apron, an endless perforated apron disposed beneath said first named endless apron, a series of rolls for pressing the matter carried by said perforated apron, a conveyer arranged to receive the matter delivered from said perforated apron, a compartment for receiving the liquid forced out by the pressure rolls, a pump for elevating the liquid, and a grease separating tank.

2. A portable garbage plant consisting of a plurality of steam cookers, receivers disposed beneath the cookers, each of said receivers being provided with a bottom comprising an endless apron, an endless perforated apron disposed beneath said first named endless apron, a series of rolls for pressing the matter carried by said perforated apron, a conveyer arranged to receive the matter delivered from said perforated apron, a compartment for receiving the liquid forced out by the pressure rolls, a pump for elevating the liquid, a grease separating tank, hydraulic presses for receiving the grease and water, and means for connecting the hydraulic presses with said grease separating tank.

3. In a portable garbage plant, a battery of digesters, each of said digesters having a hinged manhole at the upper end and being provided with a gate valve at its lower end, a water supply and a steam supply, connections between each of said digesters with said water supply and said steam supply, a common receiving tank for a plurality of said digesters, said receiving tanks having a sloping bottom and being provided with a central opening in the bottom, a traveling apron disposed just beneath said central opening and arranged to receive the contents of the receiver, a pressure roller for pressing the matter carried by said endless apron, a perforated endless apron disposed beneath said first endless apron and arranged to receive the contents of the first named endless apron, a plurality of sets of rolls for pressing the matter carried by said perforated endless apron, the liquid portions of the garbage falling through said perforations and the solid portions being delivered from the end of the perforated apron, a conveyer having a portion extending underneath the end of the perforated apron, and a storage room at the upper end of said last named conveyer.

HENRY LAMMERTZ.

Witnesses:
 LOUIS D. PETERSON,
 W. L. HAWES.